(12) United States Patent
Park

(10) Patent No.: US 10,429,410 B2
(45) Date of Patent: Oct. 1, 2019

(54) WHEEL SENSOR INTERFACE APPARATUS

(71) Applicant: Hyundai Mobis Co., Ltd., Seoul (KR)

(72) Inventor: Jaehyun Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 143 days.

(21) Appl. No.: 15/488,597

(22) Filed: Apr. 17, 2017

(65) Prior Publication Data

US 2017/0299625 A1 Oct. 19, 2017

(30) Foreign Application Priority Data

Apr. 15, 2016 (KR) .................. 10-2016-0046241

(51) Int. Cl.
  *G01P 21/00* (2006.01)
  *B60T 8/171* (2006.01)
  *G05F 3/26* (2006.01)

(52) U.S. Cl.
  CPC .............. *G01P 21/00* (2013.01); *B60T 8/171* (2013.01); *G05F 3/267* (2013.01); *B60T 2270/10* (2013.01)

(58) Field of Classification Search
  CPC ...... G01P 21/00; B60T 8/171; B60T 2270/10; G05F 3/267
  See application file for complete search history.

(56) References Cited

U.S. PATENT DOCUMENTS

| 9,580,053 | B2 | 2/2017 | Lee | |
|---|---|---|---|---|
| 2010/0182725 | A1* | 7/2010 | Trapp | B60T 8/885 361/93.1 |
| 2015/0298672 | A1* | 10/2015 | Lee | B60T 8/885 701/29.7 |

FOREIGN PATENT DOCUMENTS

| CN | 105137123 | 12/2015 |
|---|---|---|
| KR | 10-2007-0067266 | 6/2007 |

OTHER PUBLICATIONS

Office Action dated Mar. 5, 2019, in Chinese Patent Application No. 201710241925.9

* cited by examiner

*Primary Examiner* — Jermele M Hollington
*Assistant Examiner* — Feba Pothen
(74) *Attorney, Agent, or Firm* — H.C. Park & Associates, PLC

(57) ABSTRACT

A wheel sensor interface apparatus may include: a wheel sensor interface unit configured to supply power to a wheel sensor of a vehicle, or sense an output current of the wheel sensor and transmit the sensed current to a microprocessor unit of the vehicle; and an over-current detection unit including: a reference current generation unit configured to generate a reference current using a voltage across a resistor through which the output current flows; and a voltage level decision unit configured to decide a voltage level according to the reference current. The over-current detection unit may determine whether the output current is an over-current, according to the voltage level.

6 Claims, 9 Drawing Sheets

WHEEL SENSOR INTERFACE APPARATUS

CROSS-REFERENCES TO RELATED APPLICATIONS

The present application claims priority to Korean application number 10-2016-0046241, filed on Apr. 15, 2016, which is incorporated by reference in its entirety.

BACKGROUND

Field

Exemplary embodiments relate to a wheel sensor interface apparatus that recognizes a signal from a wheel sensor.

Discussion of the Background

A wheel sensor refers to a sensor which is used for sensing the rotation speed of a wheel. For example, the wheel sensor is usually used in a brake system such as ABS (Anti-lock Brake System).

The ABS performs a function of shortly and repeatedly stepping on brakes in order to prevent a lock of wheels in case of sudden braking of a vehicle. At this time, the wheel sensors are used to sense a slip of the wheels.

Furthermore, an advanced brake system which has been recently developed performs a function of sensing a slip of wheels and a turning angle of a vehicle body in a sudden dangerous situation such as a curved road or obstacle, and automatically controlling the slip and turning angle, thereby enabling a user to perform a safe steering operation. At this time, the wheel sensors are also used.

Depending on driving methods, a variety of wheel sensors (for example, active/passive/PWM/VDA wheel sensors) have been developed. However, a circuit is designed only for the active wheel sensor among the variety of wheel sensors, and has a specification for wheel sensors which are mounted in vehicles manufactured in some automobile makers (for example, Hyundai and Kia).

The wheel sensor is an element which receives a voltage within an operating voltage and outputs the received voltage as a current value (for example, 7 mA/14 mA). Due to such a feature of the wheel sensor, the current value of the wheel sensor needs to be converted into a voltage value which can be read by an ECU (Electronic Control Unit) or MCU (Micro Control Unit).

As a circuit for inputting a wheel sensor signal to an ECU in advanced brake systems which are currently mass-produced by some automobile makers, a dedicated circuit for interfacing a wheel sensor (for example, active wheel sensor) is designed and manufactured.

Such a wheel sensor interface circuit includes a pull-down resistor which receives a current value of a wheel sensor and converts the current value into a voltage. At this time, the wheel sensor interface circuit uses an operational amplifier OPAMP to recognize a change in current value of the wheel sensor. Thus, the wheel sensor interface circuit may not read the intrinsic current value of the wheel sensor, but convert and read the original signal, which makes it difficult to sense a distortion and abnormality of the original signal.

The above information disclosed in this Background section is only for enhancement of understanding of the background of the invention and, therefore, it may contain information that does not constitute prior art.

SUMMARY

Exemplary embodiments of the present invention are directed to a wheel sensor interface apparatus capable of sensing a distortion and abnormality of an original signal of a wheel sensor.

In one exemplary embodiment, a wheel sensor interface apparatus may include: a wheel sensor interface unit configured to supply power to a wheel sensor of a vehicle, sense an output current of the wheel sensor and transmit the sensed current to a microprocessor unit of the vehicle; and an over-current detection unit including: a reference current generation unit configured to generate a reference current using a voltage across a resistor through which the output current flows; and a voltage level decision unit configured to decide a voltage level according to the reference current. The over-current detection unit may determine whether the output current is an over-current, according to the voltage level.

The reference current generation unit may include: a first NPN transistor having a base terminal connected to one end of the resistor; a first PNP transistor having an emitter terminal connected to an emitter terminal of the first NPN transistor; a second NPN transistor having a base terminal connected to the other end of the resistor and a collector terminal connected to a collector terminal of the first NPN transistor; a second PNP transistor having an emitter terminal connected to an emitter terminal of the second NPN transistor and a base terminal connected to a base terminal of the first PNP transistor; a first N-channel FET having a source terminal connected to the collector and base terminals of the first PNP transistor; a second N-channel FET having a source terminal connected to a collector terminal of the second PNP transistor and a gate terminal connected to the gate terminal of the first N-channel FET; and a first current source having one end connected to drain and gate terminals of the first N-channel FET and a gate terminal of the second N-channel FET.

The voltage level decision unit may include: a third N-channel FET having a drain terminal connected to a drain terminal of the second N-channel FET; a fourth N-channel FET having a gate terminal connected to the drain terminal of the second N-channel FET, the drain terminal of the third N-channel FET and a gate terminal of the third N-channel FET; and a second current source having one end connected to a drain terminal of the fourth N-channel FET, and the reference current configured to flow through the third N-channel FET.

The same current as the reference current flowing through the third N-channel FET may flow through the fourth N-channel FET, according to a current mirror effect.

The voltage level may be decided at a node between the drain terminal of the fourth N-channel FET and one end of the second current source.

The voltage level may be transmitted to the microprocessor unit, and the microprocessor unit may determine that the output current is an over-current when the voltage level is a low level, and determine that the output current is a normal current when the voltage level is a high level.

DESCRIPTION OF EXEMPLARY EMBODIMENTS

Figure 1:
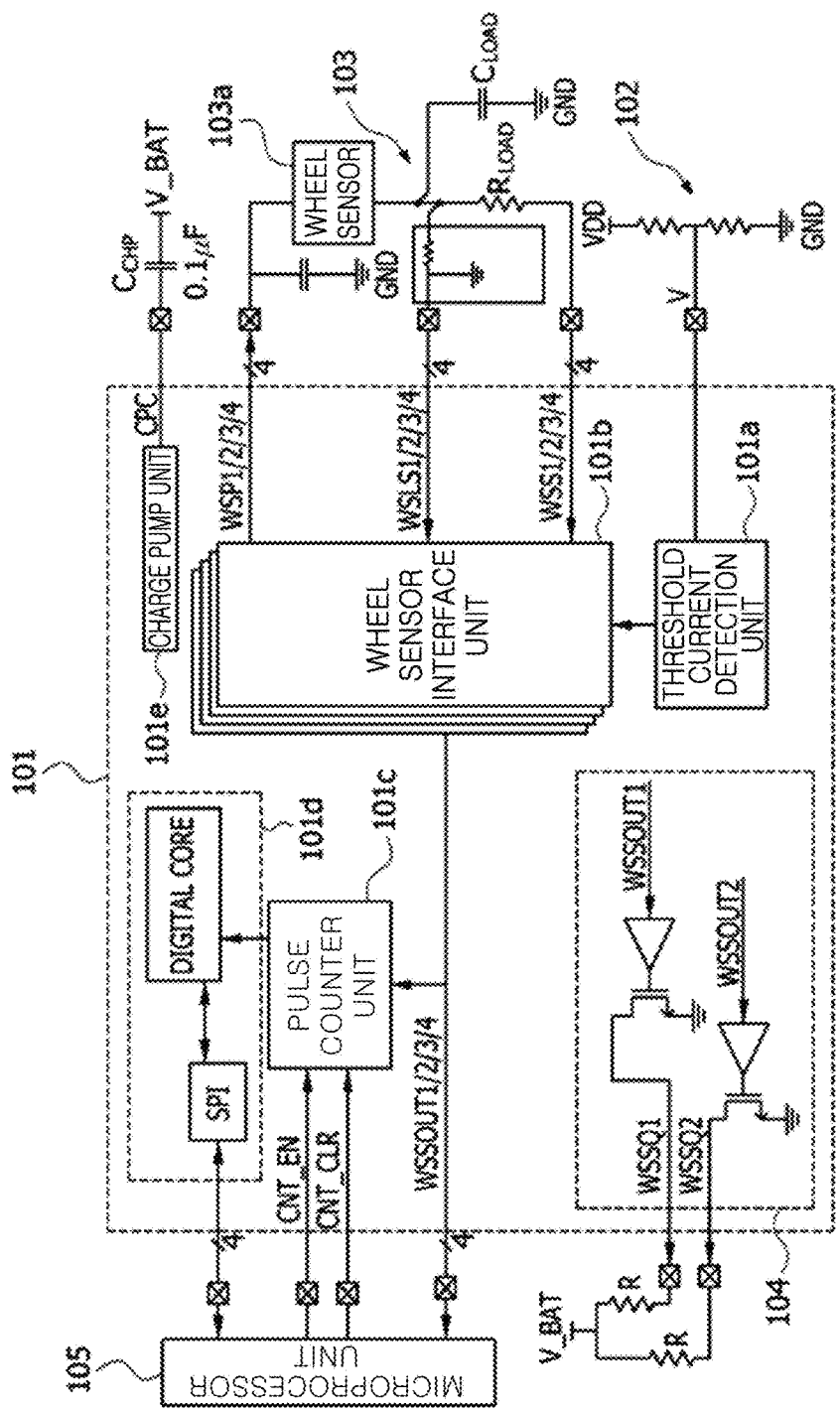
FIG. 1 is a block diagram illustrating a configuration of a wheel sensor interface apparatus in accordance with an exemplary embodiment of the present invention.

In order to understand advantages in operation and effects accomplished by exemplary embodiments of the present invention, the accompanying drawings exemplifying the exemplary embodiments of the present invention and the contents described in the drawings should be referred to.

Hereafter, exemplary embodiments of the present invention will be described in detail with reference to the accompanying drawings. However, the present invention may be embodied into various different forms, and not limited to the exemplary embodiments. Furthermore, in order to clarify the present invention, components having no relation with the descriptions are omitted, and like reference numerals in the drawings represent the same components.

Throughout the specification, when an element "includes" a certain component, it may indicate that the element does not exclude another component but can include another component, unless referred to the contrary. Furthermore, the terms "~er", "~unit", "module" and "block" described in the specification may indicate a unit for processing one or more functions or operations, and the unit can be implemented by hardware, software or a combination of hardware and software.

FIG. 1 is a block diagram illustrating a configuration of a wheel sensor interface apparatus in accordance with an exemplary embodiment of the present invention. As illustrated in FIG. 1, the wheel sensor interface apparatus may include a core unit 101, a wheel sensor type selection unit 102, a wheel sensor connection unit 103, a wheel signal output unit 104 and a microprocessor unit 105. The core unit 101 may include circuits which are commonly used in various types (or plural types) of wheel sensor interface circuits, the wheel sensor type selection unit 102 may be connected to the core unit 101 and select the type of a wheel sensor to be interfaced, the wheel sensor connection unit 103 may directly connect the core unit 101 and the wheel sensor 103a to be interfaced, the wheel signal output unit 104 may transmit a wheel signal (wheel speed signal) to a system requiring a signal detected by the wheel sensor 103a, for example, EMS (Electronic Engine Management System), TCS (Traction Control System) or ECU (Electronic Control Unit), and the microprocessor unit 105 may receive a signal outputted from the wheel sensor 103a, and process the signal into a signal which can be used by a brake system.

The wheel sensor type selection unit 102 may serve to decide the specification of the wheel sensor 103a connected to the wheel sensor interface apparatus in accordance with the exemplary embodiment of the present invention. The wheel sensor type selection unit 102 may divide a voltage, and decide whether to use a VDA wheel sensor, an active wheel sensor or a PWM wheel sensor, depending on the divided voltage value. According to the type of each wheel sensor, the corresponding voltage value may be preset. The information on the type of the wheel sensor corresponding to the voltage value may be stored in the core unit 101 in advance. Voltage values for various types of wheel sensors as well as the exemplified wheel sensor may be set and selected.

The wheel sensor connection unit 103 may be configured to mount at least four wheel sensors, depending on the number of wheels included in the vehicle. In order to not only supply power to the wheel sensors to be mounted, but also input a signal to the wheel sensors, the wheel sensor connection unit 103 may recognize a disconnection, short-circuit or over-current in a power supply unit and a signal input terminal for each of the wheel sensors, and notify the recognized disconnection, short-circuit or over-current to the microprocessor unit 105. That is, depending on the type of the wheel sensor selected by the wheel sensor type selection unit 102, a voltage to be supplied to the wheel sensor may be decided and supplied to the wheel sensor mounted on the wheel sensor connection unit 103. The wheel signal output unit 104 may control wheel signals which are transmitted to the EMS, TCS and ECU, and have a function of managing an over-voltage, over-current and thermal shutdown at an input/output terminal thereof.

The microprocessor unit 105 may replace an 8-bit MCU (Micro Control Unit) which is used in advanced brake systems which are currently mass-produced by some automobile makers. Instead of an external MCU which is separately interfaced, the microprocessor unit 105 may include an embedded microprocessor which receives a signal outputted from the wheel sensor 103a and processes the received signal into a signal which can be used by the brake system.

The core unit 101 may include a threshold current detection unit 101a, a wheel sensor interface unit 101b, a pulse counter unit 101c and a communication unit 101d. The wheel sensor interface unit 101b may supply power to a plurality of wheel sensors 103a or detect signals outputted from the wheel sensors 103a, the pulse counter unit 101c may count a pulse outputted from the wheel sensor interface unit 101b, and the communication unit 101d may communicate with the pulse counter unit 101c and the microprocessor unit 105 through SPI (Serial Peripheral Interconnect). The core unit 101 may further include a charge pump unit 101e for boosting a battery voltage to a voltage required for a specific function in the core unit 101.

The threshold current detection unit 101a may detect a threshold current for a wheel sensor of which the type corresponds to a voltage value selected by the wheel sensor type selection unit 102.

Figure 2:
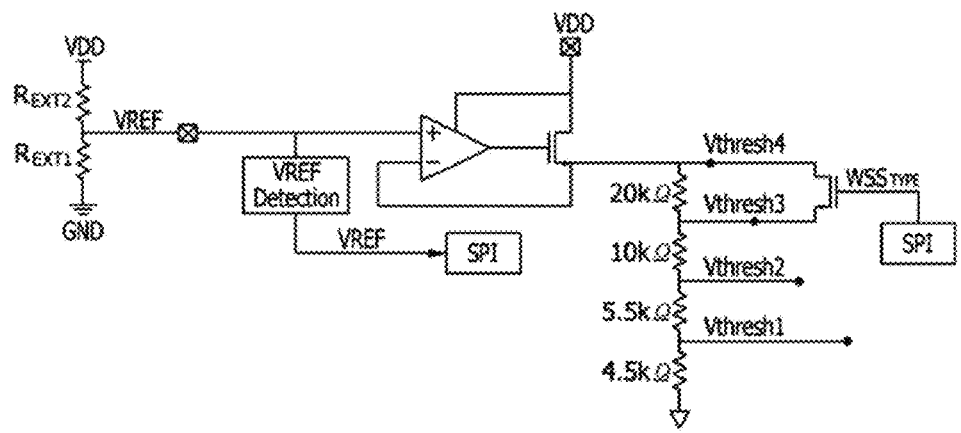
FIG. 2 is a diagram illustrating a schematic circuit configuration of a threshold current detection unit of FIG. 1.

FIG. 2 is a diagram illustrating a schematic circuit configuration of the threshold current detection unit of FIG. 1. As illustrated in FIG. 2, when the type of a wheel sensor is decided through the SPI, the threshold current detection unit may detect a current layer corresponding to the type of the wheel sensor.

For example, 'WSStype=0' may indicate that an external wheel sensor (wheel speed sensor) is an intelligent sensor, and senses a four-layer sensor current.

For example, the current threshold of the wheel sensor may be set as follows. First, an over-current threshold may be set to 40 mA, an external resistor Rload may be set to 50 ohms, for example, depending on a sensor company, and a reference voltage VREF may be calculated as (external resistor Rload*threshold current Ithreshd4) and set to '2 V=50*40 mA', for example. Thus, as the type of the wheel sensor is selected by the wheel sensor type selection unit 102, the corresponding reference voltage VREF may be calculated and set to a threshold voltage Vthresh4. The threshold voltage Vthresh4, that is, the reference voltage VREF between WSS and WSLS may become the over-current threshold, and the other current thresholds may be divided by internal resistors (for example, 20 k, 10 k, 5.5 k and 4.5 k ohms). For example, Vthresh3 may be set to 30 mA, Vthresh2 may be set to 10 mA, and Vthresh1 may be set to 4.5 mA.

For another example, 'WSStype=1' may indicate that an external wheel sensor (wheel speed sensor) is an active sensor, and senses a three-layer sensor current. For example, the current threshold of the wheel sensor may be set as follows.

First, an over-current threshold may be set to 20 mA, an external resistor Rload may be set to 120 ohms, for example, depending on a sensor company, and a reference voltage VREF may be calculated as (external resistor Rload*threshold current Ithreshd3) and set to '2.4 V=120*20 mA', for example. Thus, as the type of the wheel sensor is selected by the wheel sensor type selection unit 102, the corresponding reference voltage VREF may be calculated and set to a threshold voltage Vthresh3. The threshold voltage Vthresh3, that is, the reference voltage VREF between WSS and WSLS may become the over-current threshold, and the other current thresholds are divided by internal resistors (for example, 20 k, 10 k, 5.5 k and 4.5 k ohms). For example, Vthresh2 may be set to 10 mA, and Vthresh1 may be set to 4.5 mA.

The wheel sensor interface unit 101b may include a digital decoder (4-channel, not illustrated) which detects and processes four threshold levels detected for the respective channels, and outputs the result information WSSOUT1/WSSOUT2/WSSOUT3/WSSOUT4.

The pulse counter unit 101c counts pulses WSSOUT1/WSSOUT2/WSSOUT3/WSSOUT4 outputted from the wheel sensor interface unit 101b.

Figure 3:
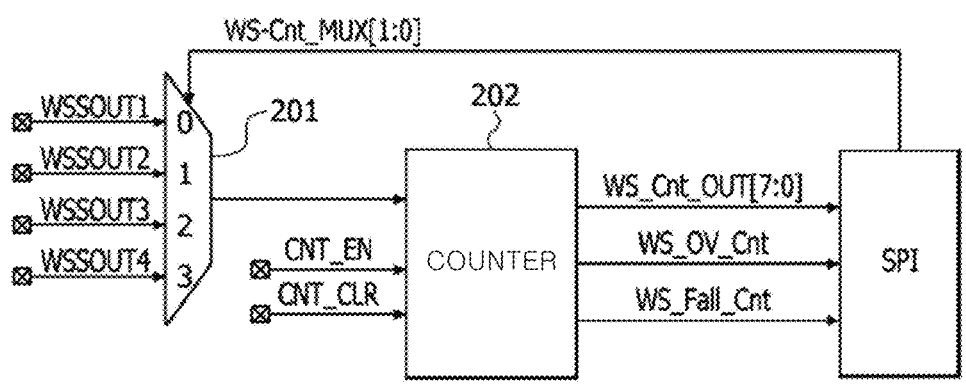
FIG. 3 is a diagram illustrating a schematic circuit configuration of a pulse counter unit of FIG. 1.

FIG. 3 is a diagram illustrating a schematic circuit configuration of the pulse counter unit 101c of FIG. 1. As illustrated in FIG. 3, one of the pulses WSSOUT1/WSSOUT2/WSSOUT3/WSSOUT4 which are digital signals may be selected by a multiplexer 201 and then inputted to a counter 202. The counter 202 may start counting according to an enable signal CNT_EN inputted thereto, and the counting may be cleared by a clear signal CNT_CLR. The output of the counter 202 may be read as eight bits WS_Cnt_OUT[7:0] through the SPI. Furthermore, a first signal WS_OV_Cnt may indicate that the counter has a maximum value, and a second signal WS_FAIL_Cnt may indicate that the enable signal CNT_EN and the clear signal CNT_CLR are simultaneously enabled to a high level.

Since the communication unit 101d and the charge pump unit 101e can be implemented with publicly known circuit configurations, the detailed descriptions thereof are omitted herein.

The core unit 101 may be implemented in the form of one chip such as ASIC (Application Specific IC). At this time, when the core unit 101 is implemented as a one chip, the core unit 101 may additionally include peripheral circuits. Furthermore, the core unit 101 may include a microprocessor integrated therein, instead of an existing MCU. In this case, a time required for resetting the MCU may not be needed while a response time can be reduced. Furthermore, the number of parts can be shortened through the ASIC, which makes it possible to reduce the number of parts at an auto-insert step while reducing the manufacturing cost.

Figure 4:
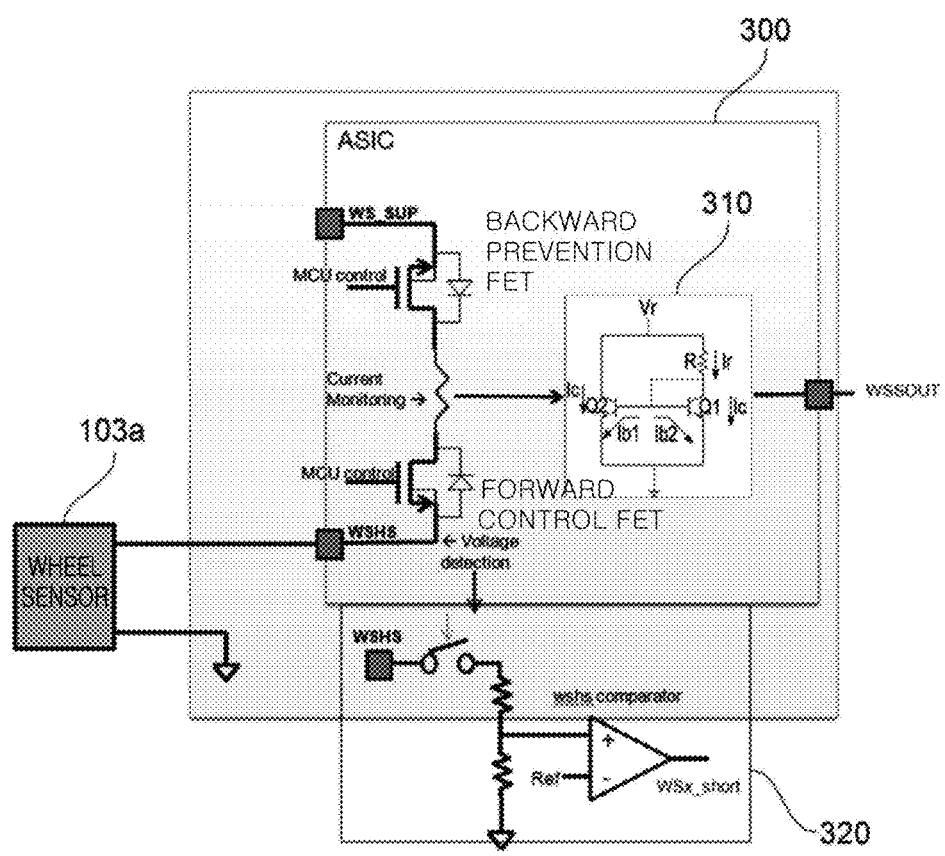
FIG. 4 is a block diagram illustrating a schematic circuit configuration of a wheel sensor interface unit in accordance with the exemplary embodiment of the present invention.

FIG. 4 is a block diagram illustrating a schematic circuit configuration of the wheel sensor interface unit in accordance with the exemplary embodiment of the present invention.

Referring to FIG. 4, the wheel sensor interface unit 300 in accordance with the exemplary embodiment of the present invention may be directly connected to the wheel sensor 103a of the vehicle through a WSHS terminal which is added to the wheel sensor interface unit 101b described with reference to FIGS. 1-3.

The wheel sensor interface unit 300 may sense an output current of the vehicle wheel sensor 103a, and convert the sensed current into a sensor signal WSSOUT which can be recognized by the microprocessor unit 105 of the vehicle.

Therefore, the wheel sensor interface unit 300 in accordance with the present exemplary embodiment may sense the output current of the vehicle wheel sensor 103a and convert the sensed current into the sensor signal WSSOUT, unlike the conventional wheel sensor interface unit which converts and amplifies a current value of a wheel sensor into a voltage value using an operational amplifier and transmits the voltage value. Therefore, the microprocessor unit 105 can recognize the intrinsic sensor signal WSSOUT of the wheel sensor 103a.

The wheel sensor interface unit 300 may include a current detection unit 310 which electrically connects the wheel sensor 103a of the vehicle to the microprocessor unit 105, senses an output current of the vehicle wheel sensor 103a, and converts the sensed current into a sensor signal.

The current detection unit 310 may include first and second NPN transistors Q1 and Q2 and a resistor R. One end of the resistor R may be connected to the wheel sensor 103a of the vehicle, the other end of the resistor R may be connected to the collector terminal and base terminal of a first NPN transistor Q1 and the base terminal of a second NPN transistor Q2, the collector terminal of the first NPN transistor Q1 may be connected to the wheel sensor 103a of the vehicle, and the emitter terminals of the first and second NPN transistors Q1 and Q2 may be connected to the microprocessor unit 105. Thus, the current detection unit 310 may sense the output current of the vehicle wheel sensor 103a, and then convert the sensed current into the sensor signal WSSOUT.

The wheel sensor interface unit 300 may further include a backward prevent FET, a forward control FET and a voltage detection unit 320. The voltage detection unit 320 may include a switch SW, first and second resistors R1 and R2 and a comparator.

The backward prevention FET, the forward control FET and the voltage detection unit 320 may be used for determining the state of the wheel sensor 103a, and will be described in detail.

Figure 5:
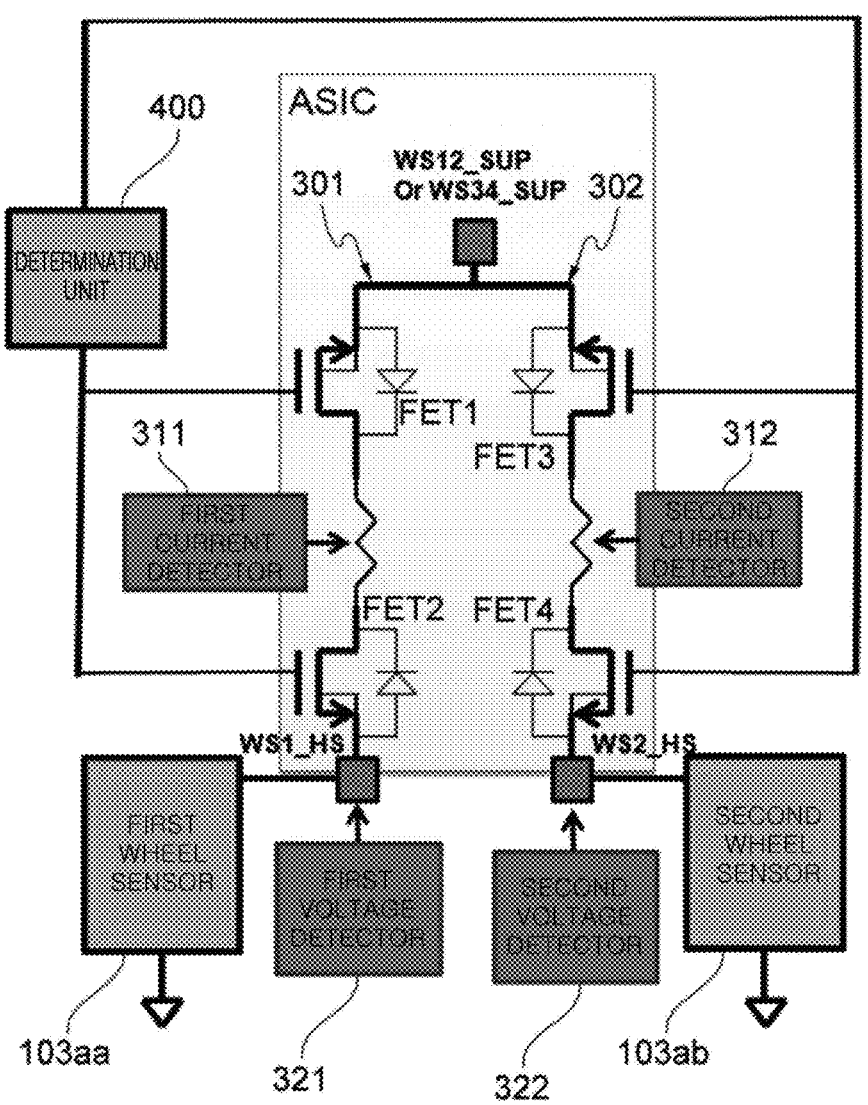
FIG. 5 is a circuit diagram for determining the states of wheel sensors using the wheel sensor interface unit in accordance with the exemplary embodiment of the present invention.

Referring to FIG. 5, the wheel sensor interface apparatus in accordance with the exemplary embodiment of the present invention may further include a determination unit 400 for determining the states of the wheel sensors of the vehicle. The wheel sensors may include a first wheel sensor 130aa for sensing the speed of the left wheel of the vehicle and a second wheel sensor 130ab for sensing the speed of the right wheel of the vehicle. The wheel sensor interface unit 300 may include a first wheel sensor interface unit 301 having one end WS1_HS connected to the first wheel sensor 103aa and a second wheel sensor interface unit 302 having one end SW2_HS connected to the second wheel sensor 103ab. The other ends WS12_SUP and WS34_SUP of the first and second wheel sensor interface units 301 and 302 may be connected to each other. At this time, the determination unit 400 may control the first and second wheel sensor interface units 301 and 302 to determine the states of the first and second wheel sensors 103aa and 103ab.

The first wheel sensor interface unit 301 may further include a first backward prevention FET FET1, a first forward control FET FET2, a first current detector 311 and a first voltage detector 321, and the second wheel sensor interface unit 302 may further include a second backward prevention FET FET3, a second forward control FET FET4, a second current detector 312 and a second voltage detector 322.

The determination unit 400 may control the first and second backward prevention FETs FET1 and FET3 and the first and second forward control FETs FET2 and FET4 to determine the states of the first and second wheel sensors 103aa and 103ab.

Next, referring to FIGS. 6-9, a method for determining the states of the wheel sensors through the determination unit 400 will be described.

Table 1 shows whether the determination unit 400 can determine the states of the wheel sensors, depending on information on four cases in which the FETs of the wheel sensor interface unit 300 are controlled.

TABLE 1

|  | Case1 | Case2 | Case3 | Case4 |
| --- | --- | --- | --- | --- |
| FET1 | ON | ON | OFF | OFF |
| FET2 | ON | ON | OFF | OFF |
| FET3 | ON | OFF | ON | OFF |
| FET4 | ON | OFF | ON | OFF |
|  | Ground short Determinable | Short between wheel sensors Determinable | Short between wheel sensors Determinable | Power supply short Determinable |

Figure 6:
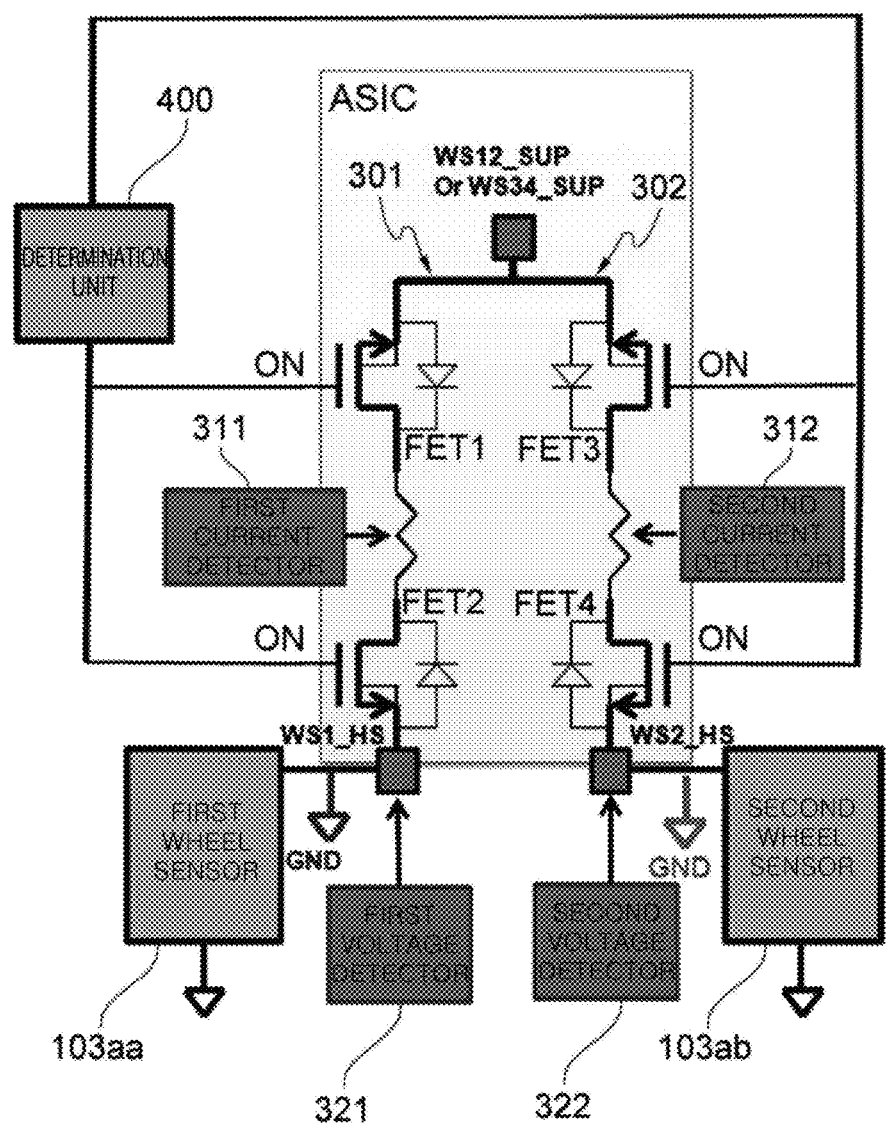
FIG. 6 is a first diagram for describing a wheel sensor state determination method in accordance with an exemplary embodiment of the present invention.

Referring to FIG. 6, the determination unit 400 may turn on the first and second backward prevention FETs FET1 and FET3 and the first and second forward control FETs FET2 and FET4 (Case1 of Table 1), and determine whether the first wheel sensor 103aa and the second wheel sensor 103ab are shorted to ground, using the output values of the first and second current detectors 311 and 312 and the first and second voltage detectors 321 and 322.

Table 2 below shows the output values of the first and second current detectors 311 and 312 and the first and second voltage detectors 321 and 322, according to Case1 of Table 1.

TABLE 2

|  | First current detector | Second current detector | First voltage detector | Second voltage detector | Result |
| --- | --- | --- | --- | --- | --- |
| 1 | 7 or 14 mA | 7 or 14 mA | HIGH | HIGH | Normal |
| 2 | Current limit | 7 or 14 mA | LOW | HIGH | First wheel sensor ground short |
| 3 | 7 or 14 mA | Current limit | HIGH | LOW | Second wheel sensor ground short |

That is, when the current values detected by the first and second current detectors 311 and 312 are 7 mA or 14 mA and the voltage levels detected by the first and second voltage detectors 321 and 322 are a high level, the determination unit 400 may determine that the states of the first and second wheel sensors 103aa and 130ab are normal. Each of the first and second voltage detectors 321 and 322 may compare an input voltage applied to the input terminal thereof to the reference voltage Ref, and output a high-level signal when the input voltage is equal to or more than the reference voltage Ref or output a low-level signal when the input voltage is less than the reference voltage Ref.

Furthermore, when the current value detected by the first current detector 311 is the current limit, the current value detected by the second current detector 312 is 7 mA or 14 mA, the voltage level detected by the first voltage detector 321 is a low level, and the voltage level detected by the second voltage detector 322 is a high level, the determination unit 400 may determine that the first wheel sensor 103aa is shorted to ground.

Moreover, when the current value detected by the first current detector 311 is 7 mA or 14 mA, the current value detected by the second current detector 312 is the current limit, the voltage level detected by the first voltage detector 321 is a high level, and the voltage level detected by the second voltage detector 322 is a low level, the determination unit 400 may determine that the second wheel sensor 103ab is shorted to ground.

Figure 7:
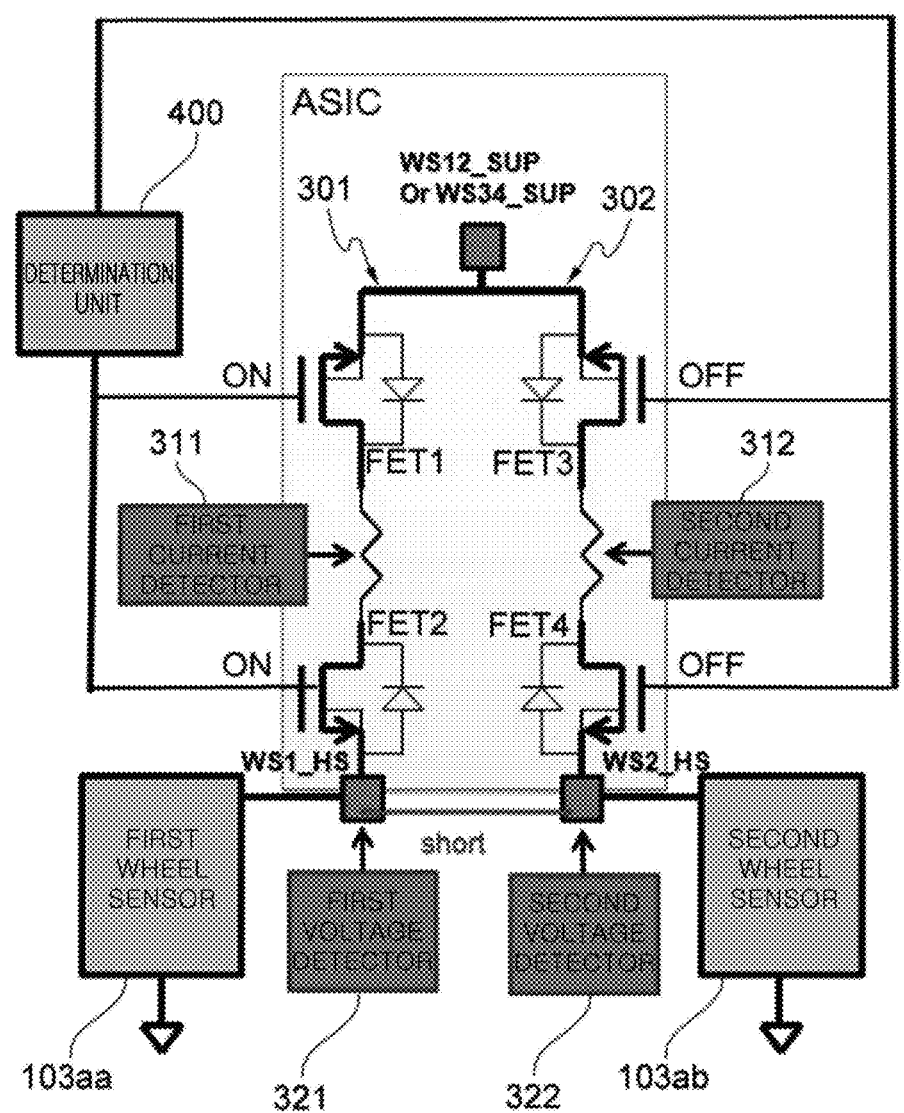
FIG. 7 is a second diagram for describing the wheel sensor state determination method in accordance with the exemplary embodiment of the present invention.

Referring to FIG. 7, the determination unit 400 may turn on the first backward prevention FET FET1 and the first forward control FET FET3, turn off the second backward prevention FET FET3 and the forward control FET FET4 (Case2 of Table 1), and determine whether the first wheel sensor 103aa and the second wheel sensor 103ab are shorted to each other, using the output values of the first and second current detectors 311 and 312 and the first and second voltage detectors 321 and 322.

Table 3 below shows the output values of the first and second current detectors 311 and 312 and the first and second voltage detectors 321 and 322, according to Case2 of Table 1.

TABLE 3

|  | First current detector | Second current detector | First voltage detector | Second voltage detector | Result |
| --- | --- | --- | --- | --- | --- |
| 1 | 7 or 14 mA | 0 A | HIGH | LOW | Normal |
| 2 | 14, 21 or 28 mA | 0 A | HIGH | HIGH | Short between first and second wheel sensors |

That is, when the current value detected by the first current detector 311 is 7 mA or 14 mA, the current value detected by the second current detector 312 is 0 A, the voltage level detected by the first voltage detector 321 is a high level, and the voltage level detected by the second voltage detector 322 is a low level, the determination unit 400 may determine that the states of the first and second wheel sensors 103aa and 103ab are normal.

Furthermore, when the current value detected by the first current detector 311 is 14, 21 or 28 mA, the current value detected by the second current detector 312 is 0 A, the voltage level detected by the first voltage detector 321 is a high level, and the voltage level detected by the second voltage detector 322 is a high level, the determination unit 400 may determine that the first and second wheel sensors 103aa and 103ab are shorted to each other.

Figure 8:
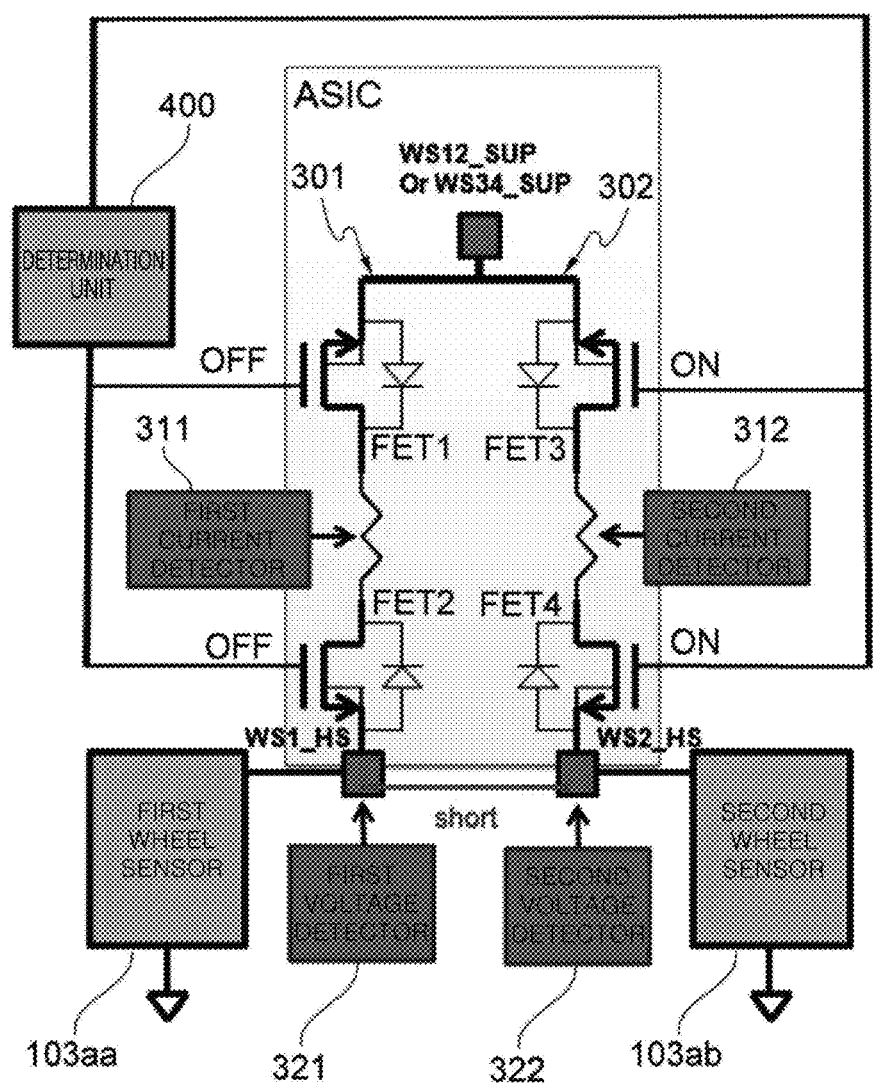
FIG. 8 is a third diagram for describing the wheel sensor state determination method in accordance with the exemplary embodiment of the present invention.

Referring to FIG. 8, the determination unit 400 may turn off the first backward prevention FET FET1 and the first forward control FET FET3, turn on the second backward prevention FET FET3 and the second forward control FET FET4 (Case3 of Table 1), and determine whether the first wheel sensor 103aa and the second wheel sensor 103ab are shorted to each other, using the output values of the first and second current detectors 311 and 312 and the first and second voltage detectors 321 and 322.

Table 4 below shows the output values of the first and second current detectors 311 and 312 and the first and second voltage detectors 321 and 322, according to Case3 of Table 1.

TABLE 4

| | First current detector | Second current detector | First voltage detector | Second voltage detector | Result |
|---|---|---|---|---|---|
| 1 | 0 A | 7 or 14 mA | LOW | HIGH | Normal |
| 2 | 0 A | 14, 21 or 28 mA | HIGH | HIGH | Short between first and second wheel sensors |

That is, when the current value detected by the first current detector 311 is 0 A, the current value detected by the second current detector 312 is 7 mA or 14 mA, the voltage level detected by the first voltage detector 321 is a low level, and the voltage level detected by the second voltage detector 322 is a high level, the determination unit 400 may determine that the states of the first and second wheel sensors 103aa and 103ab are normal.

Furthermore, when the current value detected by the first current detector 311 is 0 A, the current value detected by the second current detector 312 is 14, 21 or 28 mA, the voltage level detected by the first voltage detector 321 is a high level, and the voltage level detected by the second voltage detector 322 is a high level, the determination unit 400 may determine that the first and second wheel sensors 103aa and 103ab are shorted to each other.

Figure 9:
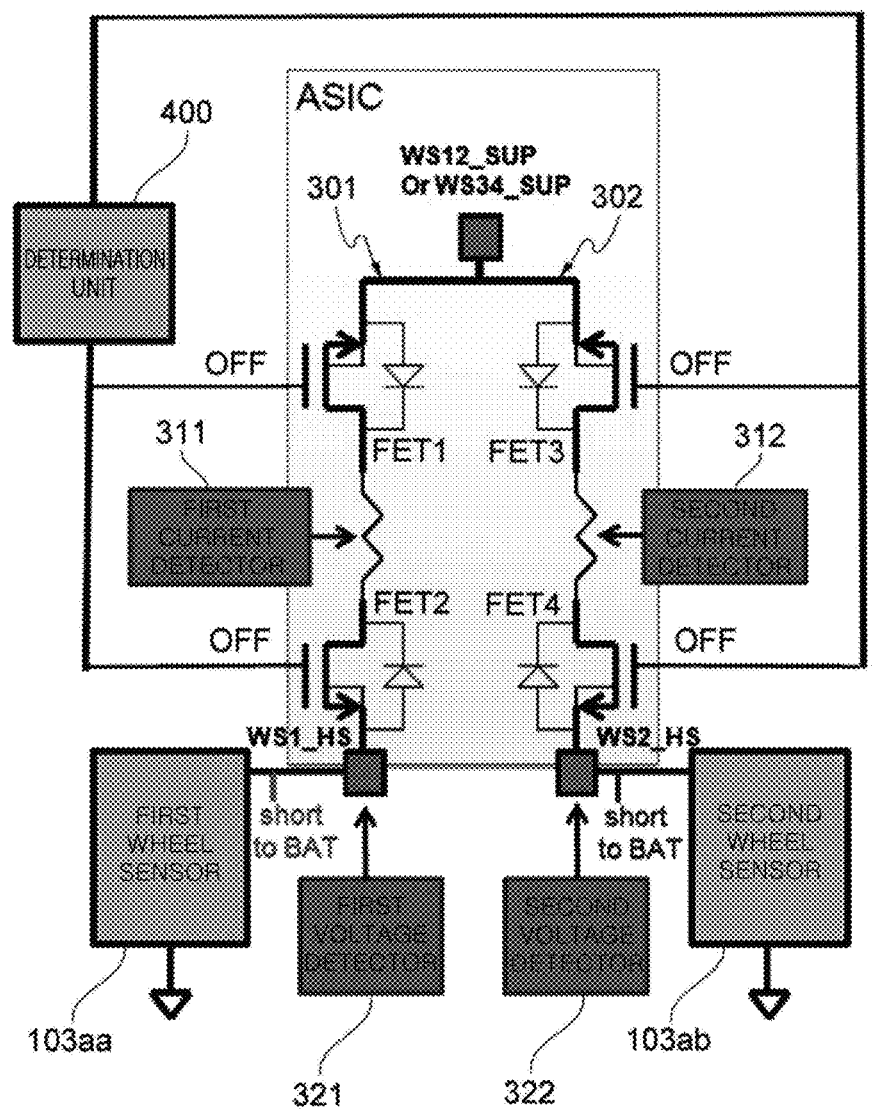
FIG. 9 is a fourth diagram for describing the wheel sensor state determination method in accordance with the exemplary embodiment of the present invention.

Referring to FIG. 9, the determination unit 400 may turn off the first and second backward prevention FETs FET1 and FET3 and the first and second forward control FETs FET2 and FET4 (Case4 of Table 1), and determine whether the first wheel sensor 103aa and the second wheel sensor 103ab are shorted to the power supply, using the output values of the first and second current detectors 311 and 312 and the first and second voltage detectors 321 and 322.

Table 5 below shows the output values of the first and second current detectors 311 and 312 and the first and second voltage detectors 321 and 322, according to Case4 of Table 1.

TABLE 5

| | First current detector | Second current detector | First voltage detector | Second voltage detector | Result |
|---|---|---|---|---|---|
| 1 | 0 A | 0 A | LOW | LOW | Normal |
| 2 | 0 A | 0 A | HIGH | LOW | First wheel sensor power supply short |
| 3 | 0 A | 0 A | LOW | HIGH | Second wheel sensor power supply short |

That is, when the current values detected by the first and second current detectors 311 and 312 are 0 A and the voltage levels detected by the first and second voltage detectors 321 and 322 are a low level, the determination unit 400 may determine that the states of the first and second wheel sensors 103aa and 103ab are normal.

Furthermore, when the current values detected by the first and second current detectors 311 and 312 are 0 A, the voltage level detected by the first voltage detector 321 is a high level, and the voltage level detected by the second voltage detector 322 is a low level, the determination unit 400 may determine that the first wheel sensor 103aa is shorted to the power supply.

Moreover, when the current values detected by the first and second current detectors 311 and 312 are 0 A, the voltage level detected by the first voltage detector 321 is a low level, and the voltage level detected by the second voltage detector 322 is a high level, the determination unit 400 may determine that the second wheel sensor 103ab is shorted to the power supply.

The wheel sensor interface apparatus in accordance with the exemplary embodiment of the present invention may just sense the output currents of the wheel sensors 103aa and 103ab through the wheel sensor interface unit 300 without converting and amplifying the output currents into voltages, and convert the sensed currents into sensor signals which can be recognized by the microprocessor unit 105. Therefore, since the wheel sensor interface apparatus does not need a separate circuit for signal conversion but may have only the current detectors, the number of parts and the manufacturing cost can be reduced, and the original signal can be easily distinguished from an external voltage while an abnormality of the original signal can be easily sensed.

Furthermore, the wheel sensor interface apparatus can determine the states of the vehicle wheel sensors through the determination unit 400. Since the wheel sensor interface apparatus can catch an abnormality of the wheel sensors, the wheel sensors can be rapidly checked, which makes it possible to improve the stability of the vehicle.

Figure 10:
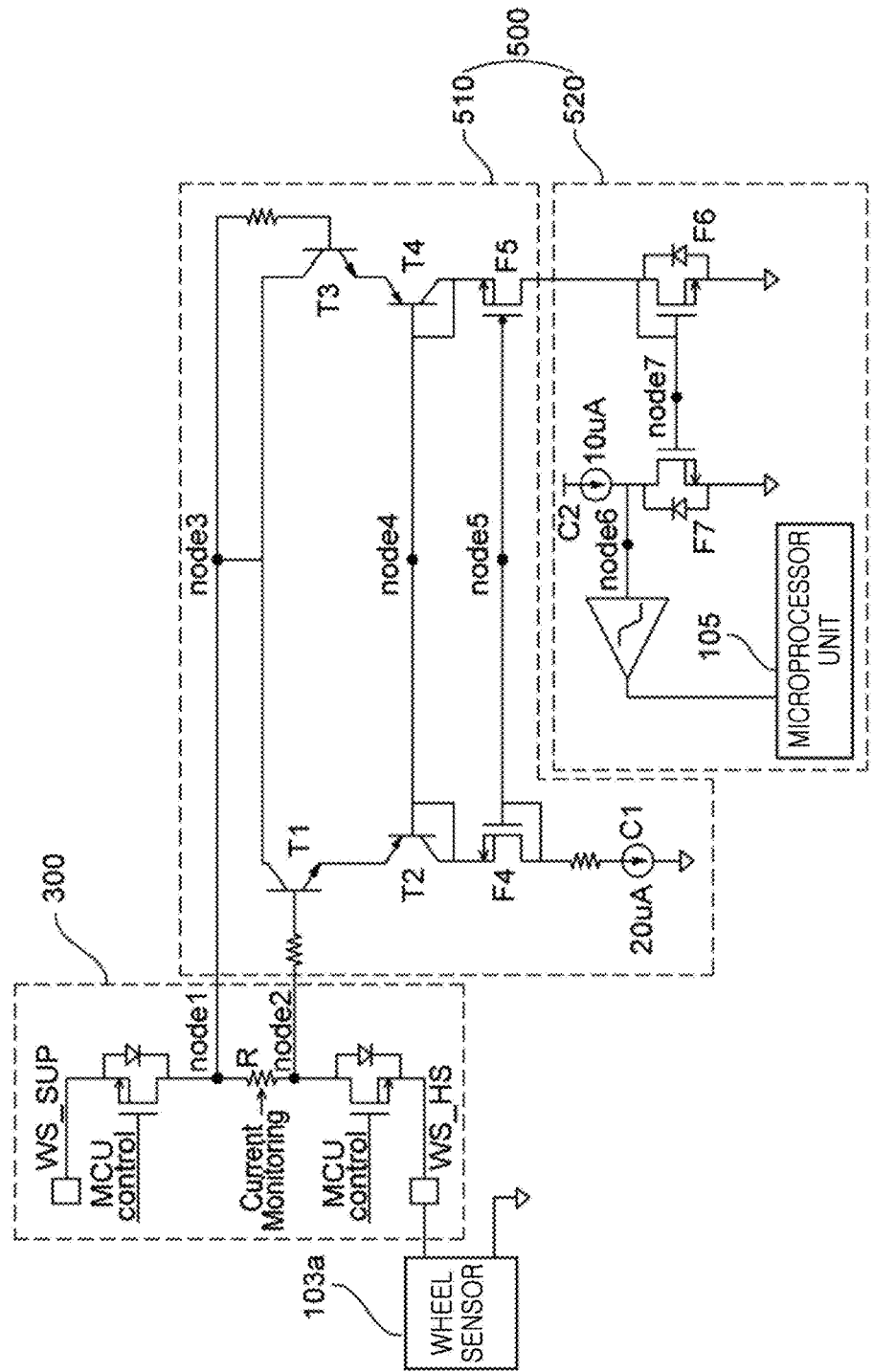
FIG. 10 is a circuit diagram of an over-current detection unit in a wheel sensor interface apparatus in accordance with another exemplary embodiment of the present invention.

Referring to FIG. 10, a wheel sensor interface apparatus according to another exemplary embodiment of the present invention may include a wheel sensor interface unit 300 and an over-current detection unit 500 having a reference current generation unit 510 and a voltage level decision unit 520. The wheel sensor interface unit 300 may supply power to a wheel sensor 103a of a vehicle or detect an output current of the wheel sensor 103a and transmit the detected current to a microprocessor unit 105, the reference current generation unit 510 may generate a reference current using a voltage across a resistor R through which the output current flows, and the voltage level decision unit 520 may decide a voltage level according to the reference current. The microprocessor unit 105 may determine whether the output current is an over-current, according to the voltage level.

Therefore, since the wheel sensor interface apparatus in accordance with the present exemplary embodiment includes the over-current detection unit 500, the wheel sensor interface apparatus can immediately recognize an occurrence of over-current depending on a breakdown such as disconnection or short-circuit of the wheel sensor 103a. Then, the wheel sensor interface apparatus can rapidly check the wheel sensor, and lower an accident risk of the vehicle due to an occurrence of over-current in the wheel sensor.

The reference current generation unit 510 may include: a first NPN transistor T1 having a base terminal connected to one end node2 of a resistor; a first PNP transistor T2 having an emitter terminal connected to the emitter terminal of the first NPN transistor T1; a second NPN transistor T3 having a base terminal connected to the other end node1 of the resistor and a collector terminal connected to the collector terminal of the first NPN transistor T1; a second PNP transistor T4 having an emitter terminal connected to the emitter terminal of the second NPN transistor T3 and a base terminal connected to the base terminal of the first PNP transistor T2; a first N-channel FET F4 having a source terminal connected to the collector terminal and base terminal of the first PNP transistor T2; a second N-channel FET F5 having a source terminal connected to the collector terminal of the second PNP transistor T4 and a gate terminal connected to the gate terminal of the first N-channel FET F4; and a first current source C1 having one end connected to the drain and gate terminals of the first N-channel FET F4 and the gate terminal of the second N-channel FET F5.

The reference current generation unit 510 may include a plurality of resistors for turning on/off the various transistors and FETs. A first resistor R1 may be installed between the base terminal of the first NPN transistor T1 and the one end node2 of the resistor R. A second resistor R2 may be installed between the base terminal of the second NPN transistor T3 and the other end node1 of the resistor R. A third resistor R3 may be installed between the one end of the first current source C1 and the gate terminals of the first and second N-channel FETs F4 and F5. Through this configuration, the reference current generation unit 510 can generate the reference current.

The reference current generation process of the reference current generation unit 510 may be performed as follows. First, the first current source C1 may connect the gate terminals of the first and second N-channel FETs F4 and F5 to the ground, and turn on the first and second N-channel FETs F4 and F5. In this example, the first current source C1 may pass a current of 20 µA.

When an over-current is generated from the wheel sensor 103a, a high voltage may be applied to the base terminal of the second NPN transistor T3. Simultaneously, a voltage difference of 0.7 V may occur between the base terminal and emitter terminal of the first NPN transistor T1, and a voltage difference of 0.7 V may occur between the base terminal and emitter terminal of the first PNP transistor T2. That is, a total voltage difference of 1.4 V may occur. The voltage difference may cause a voltage difference between the node3 and node4.

At this time, a node node3 may correspond to any one point to which the other node node2 of the resistor R, the collector terminal of the first NPN transistor T1, the base terminal of the second NPN transistor T3, and the collector terminal of the second NPN transistor T3 are connected, and a node node4 may correspond to any one point to which the base terminal of the first PNP transistor T2 and the base terminal of the second PNP transistor T4 are connected.

At this time, the voltage difference between the nodes node3 and node4 may turn on the second NPN transistor T3 and the second PNP transistor T4, and then generate the reference current to flow to the voltage level decision unit 520.

The voltage level decision unit 520 may include: a third N-channel FET F6 having a drain terminal connected to the drain terminal of the second N-channel FET F5; a fourth N-channel FET F7 having a gate terminal connected to the drain terminal of the second N-channel FET F5, the drain terminal of the third N-channel FET F6 and the gate terminal of the third N-channel FET F6; and a second current source C2 having one end connected to the drain terminal of the fourth N-channel FET F7.

The reference current generated by the reference current generation unit 510 may flow through the third N-channel FET F6, and the voltage level may be determined through the reference current.

The voltage level decision process of the voltage level decision unit 520 may be performed as follows. First, the same current as the reference current flowing through the third N-channel FET F6 may flow through the fourth N-channel FET F7, according to the current mirror effect.

The second current source C2 may pass a proper current, for example, a current of 10 µA.

At this time, when a higher current than the current of the second current source C2 flows through the fourth N-channel FET F7, the voltage of a node node6 may be dropped and set to a low level. Then, the output current of the wheel sensor may be determined as an over-current.

On the other hand, when a lower current than the current of the second current source C2 flows through the fourth N-channel FET F7, the voltage of the node node6 may be raised and set to a high level. Then, the output current of the wheel sensor may be determined as a normal current.

The node node6 may correspond to any one point between the drain terminal of the fourth N-channel FET F7 and the one end of the second current source C2.

Then, the voltage level of the node node6 may be transmitted to the microprocessor unit 105, and the microprocessor unit 105 may determine that the output current is an over-current, when the voltage level is a low level, and determine that the output current is a normal current, when the voltage level is a high level.

The method according to the exemplary embodiment of the present invention can be embodied as a computer readable code in a computer readable recording medium. The computer readable recording medium may include all kinds of storage devices for storing data which can be read by a computer system. Examples of the recording medium may include ROM, RAM, CD-ROM, a magnetic tape, a floppy disk, an optical storage device and the like, and can be embodied in the form of a carrier wave (for example, transmission through the Internet). Furthermore, the computer readable recording medium may be distributed to computer systems connected through a network, such that a code which can be read by a computer in a distributed manner can be stored and executed.

In accordance with the present exemplary embodiment, since the wheel sensor interface apparatus includes the over-current detection unit, the wheel sensor interface apparatus can immediately recognize an occurrence of over-current depending on a breakdown such as disconnection or short-circuit of the wheel sensor. Then, the wheel sensor interface apparatus can rapidly check the wheel sensor, and lower an accident risk of the vehicle due to an occurrence of over-current in the wheel sensor.

Although preferred exemplary embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A wheel sensor interface apparatus, comprising:
    a wheel sensor interface unit configured to supply power to a wheel sensor of a vehicle, sense an output current of the wheel sensor and transmit the sensed current to a microprocessor unit of the vehicle; and
    an over-current detection unit comprising: a reference current generation unit configured to generate a reference current using a voltage across a resistor through which the output current flows; and a voltage level decision unit configured to decide a voltage level according to the reference current,
    wherein the reference current generation unit comprises:
    a first NPN transistor having a base terminal connected to one end of the resistor;
    a first PNP transistor having an emitter terminal connected to an emitter terminal of the first NPN transistor;
    a second NPN transistor having a base terminal connected to the other end of the resistor and a collector terminal connected to a collector terminal of the first NPN transistor;
    a second PNP transistor having an emitter terminal connected to an emitter terminal of the second NPN transistor and a base terminal connected to a base terminal of the first PNP transistor; and
    wherein the over-current detection unit determines whether the output current is an over-current, according to the voltage level.

2. The wheel sensor interface apparatus of claim 1, wherein the reference current generation unit comprises:
    a first N-channel FET having a source terminal connected to the collector and base terminals of the first PNP transistor;
    a second N-channel FET having a source terminal connected to a collector terminal of the second PNP transistor and a gate terminal connected to the gate terminal of the first N-channel FET; and
    a first current source having one end connected to drain and gate terminals of the first N-channel FET and a gate terminal of the second N-channel FET.

3. The wheel sensor interface apparatus of claim 2, wherein the voltage level decision unit comprises:
    a third N-channel FET having a drain terminal connected to a drain terminal of the second N-channel FET;
    a fourth N-channel FET having a gate terminal connected to the drain terminal of the second N-channel FET, the drain terminal of the third N-channel FET and a gate terminal of the third N-channel FET; and
    a second current source having one end connected to a drain terminal of the fourth N-channel FET, and
    the reference current configured to flow through the third N-channel FET.

4. The wheel sensor interface apparatus of claim 3, wherein the same current as the reference current flowing through the third N-channel FET flows through the fourth N-channel FET, according to a current mirror effect.

5. The wheel sensor interface apparatus of claim 4, wherein the voltage level is decided at a node between the drain terminal of the fourth N-channel FET and one end of the second current source.

6. The wheel sensor interface apparatus of claim 5, wherein the voltage level is transmitted to the microprocessor unit, and the microprocessor unit determines that the output current is an over-current when the voltage level is a low level, and determines that the output current is a normal current when the voltage level is a high level.

* * * * *